Oct. 20, 1925.
T. H. SUTHERLAND
1,558,061
AUTOMOBILE BRAKE
Filed April 21, 1924
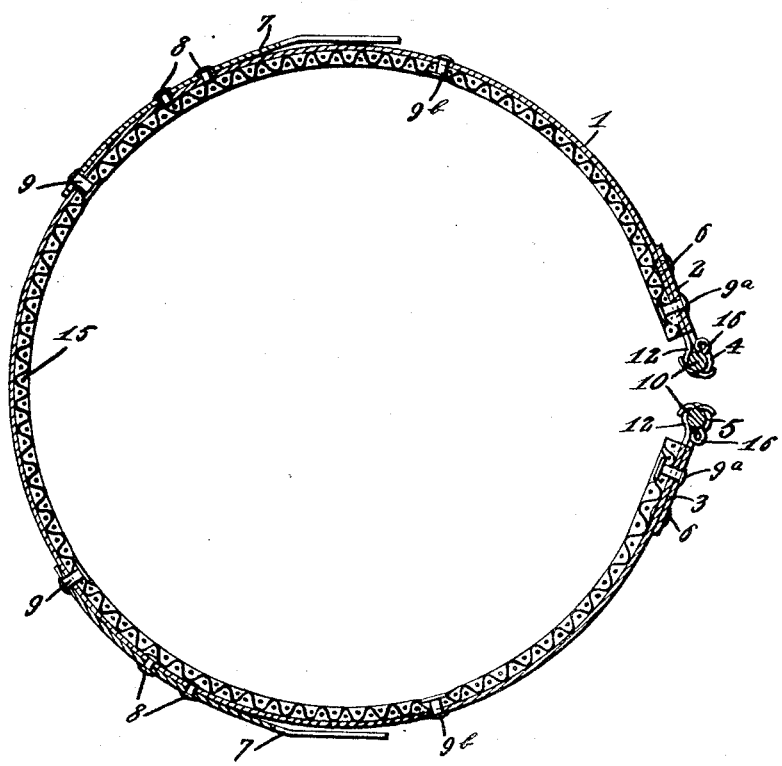
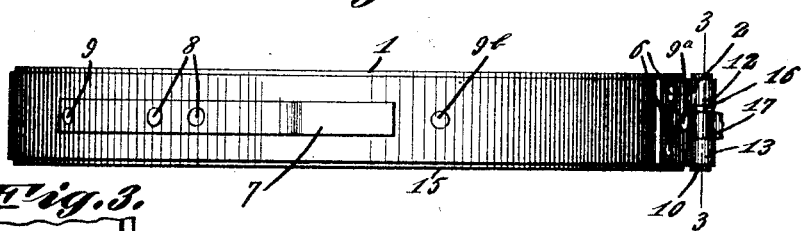
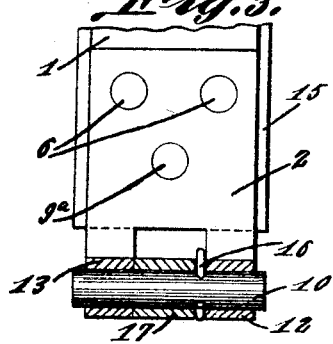
T. H. Sutherland, Inventor
By C. A. Snow & Co.
Attorneys.

Patented Oct. 20, 1925.

1,558,061

UNITED STATES PATENT OFFICE.

THOMAS H. SUTHERLAND, OF WASHINGTON, PENNSYLVANIA.

AUTOMOBILE BRAKE.

Application filed April 21, 1924. Serial No. 707,958.

*To all whom it may concern:*

Be it known that I, THOMAS H. SUTHERLAND, a citizen of the United States, residing at Washington, in the county of Washington and State of Pennsylvania, have invented a new and useful Automobile Brake, of which the following is a specification.

This invention relates to hub brakes for automobiles.

The object of the invention is to provide a brake of this character so constructed as to be reversible to increase the life and service of the lining.

Another object is to provide a brake of this character so constructed as to enable a workman, with very simple tools, to install the brake on the wheel, remove it therefrom, or change it from one wheel to another without removing the wheel.

Another object is to so locate all permanent or construction rivets in the bands that they cannot contact with the brake drum and thus avoid scoring of the drum and nullifying of the desired frictional effect of the lining upon the drum.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a horizontal section through a brake band constructed in accordance with this invention;

Fig. 2 is an edge or peripheral view of the band;

Fig. 3 is an enlarged detail elevation of one of the ends of the brake band showing the peculiar hinge pins employed.

In the embodiment illustrated a brake band 1 is shown having the ends thereof folded outward and backward as shown at 2 and 3 forming loops or journals 4 and 5 to receive the hinge pins 10. These ends 2 and 3 contact with the band and are riveted thereto by permanent or construction rivets 6.

Mounted on the outer face of the band 1 are plate springs 7 two of which are here shown and which are secured at one end to the band 1 by permanent or construction rivets 8. Soft rivets 9 connect one terminal of each spring with the band and pass through the lining 15. These rivets 9 have their heads embedded in the lining so as to be out of contact with the brake drum and are made preferably of soft copper and operate to hold the lining in position on the band and should they contact with the drum they will make no noise nor score the drum.

The free ends of the springs 7 are left free and are designed to engage the controllers, not shown, which are carried by the housings of automobiles. These springs furnish two of the four points of contact with the third member of the car, the other two points being the pins 10.

The brake lining 15 which is constructed of the usual material has its ends secured to the folded ends of the brake band 1 by soft copper rivets $9^a$ similar to those which secure the springs 7. As shown two other of these soft rivets are used as shown at $9^b$, it being of course understood that any desired number may be employed, as may be found necessary.

By constructing both ends of the band 1 alike and by locating the apertures in the band so that they will engage with the sustaining parts of the band in either the right or the left position on the wheel, the band may be reversed without removing the wheel. This reversing of the band adapts the lower portion of the lining, which ordinarily wears out first and renders the band useless, to be placed at the top when partially worn thus prolonging the life of the lining.

The pins 10 which are journaled in the bearings 4 and 5 connect the cam hinge members 17 with the band and these members 17 are located between the bearing members 12 and 13 and are of less length than the distance between the bearing members. The pins are equipped with apertures which extend transversely through the pins adjacent one of the bearings 12 or 13 and are designed to receive cotter pins 16. These cotter pins are placed on the outer side of the cam, which renders them more accessible than when they are placed against the flange. Pins constructed as herein shown provide a full strength head requiring no cutting to form the head. This arrangement of the cotter pins facilitates the removal and replacement of the brake bands.

Brake bands constructed as herein shown and described may be installed on cars already manufactured as well as on those newly made and much labor is saved owing to the fact that the wheels do not have to be removed to install or reverse the brakes.

I claim:—

1. A brake band for vehicles having its end folded outwardly and rearwardly and secured to form bearings, portions of said bearings being cut away intermediate their ends to receive the cam members, and cam attaching pins mounted in said bearings and having cotter pins located in said cut out portions.

2. A brake band for vehicles having its ends folded outwardly and rearwardly and secured to form bearings, portions of said bearings being cut away intermediate their ends, and cam attaching pins mounted in said bearings and having cotter pin receiving apertures extending transversely therethrough.

In testimony that I claim the foregoing as my own, I have hereto affixed my signature.

THOMAS H. SUTHERLAND.